United States Patent [19]
Koutsoupidis

[11] Patent Number: 4,807,577
[45] Date of Patent: Feb. 28, 1989

[54] PERISTROPHIC INTERNAL COMBUSTION ENGINE ASSEMBLY AND MULTI-PART PISTONS

[76] Inventor: Theodore Koutsoupidis, Kekropos 39, Glyfada, Athens 166-75, Greece

[21] Appl. No.: 923,273

[22] Filed: Oct. 27, 1986

Related U.S. Application Data

[63] Continuation-in-part of Ser. No. 769,966, Aug. 27, 1985, abandoned.

[30] Foreign Application Priority Data

Mar. 3, 1986 [GR] Greece ................................. 860589

[51] Int. Cl.$^4$ ............................ F16J 1/24; F16J 1/02; F16J 1/14; F16J 10/04
[52] U.S. Cl. .......................... 123/193 P; 123/193 CP; 123/197 AC; 92/171; 92/178; 92/187; 92/255; 74/579 E; 384/49; 403/150; 403/154; 403/320
[58] Field of Search ................. 92/175, 178, 187, 255, 92/258, DIG. 1, 246, 247, 257, 189, 190; 123/197 R, 45, 197 A, 197 AB, 197 AC, 56 R, 56 C, 193 P, 193 CP; 403/320, 343, 150, 152, 154; 384/42, 49; 74/579 E

[56] References Cited

U.S. PATENT DOCUMENTS

| 997,480 | 7/1911 | Twombly | 92/255 X |
|---|---|---|---|
| 1,503,369 | 7/1924 | Lavoie | 92/175 |
| 1,684,862 | 9/1928 | Gay | 92/187 |
| 1,772,966 | 8/1930 | Solver | 92/187 |
| 1,906,765 | 5/1933 | Purkey | 92/178 |
| 1,943,364 | 1/1934 | Betz | 92/187 X |
| 2,188,106 | 1/1940 | Caldwell | 92/175 X |
| 2,463,174 | 3/1949 | Hasselberg | 123/197 AC |
| 2,712,483 | 7/1955 | Ciaccia | 384/49 X |
| 2,851,903 | 9/1958 | Norris et al. | 92/258 X |
| 3,034,362 | 5/1962 | Caddell | 123/197 AB X |
| 3,136,306 | 6/1964 | Kamm | 92/255 X |
| 3,165,094 | 1/1965 | Lechtenberg | 92/171 X |
| 3,315,573 | 4/1967 | Decoyedecastelet | 92/171 X |
| 3,604,204 | 9/1971 | Conrad et al. | 123/197 X |
| 3,628,427 | 12/1971 | Bailey | 92/171 |
| 3,698,264 | 10/1972 | York | 92/255 X |
| 3,704,904 | 12/1972 | Rizzone | 403/343 X |
| 3,937,201 | 2/1976 | Howe | 92/171 X |
| 4,016,850 | 4/1977 | Bloemers | 92/171 X |
| 4,085,628 | 4/1978 | McWhorter | 123/197 A X |
| 4,174,616 | 11/1979 | Nederlof et al. | 92/171 X |
| 4,268,042 | 5/1981 | Borlan | 92/178 X |
| 4,329,124 | 5/1982 | Pridy | 403/343 X |
| 4,383,508 | 5/1983 | Irimajiri et al. | 92/187 X |
| 4,398,862 | 8/1983 | Schroeder | 403/154 X |
| 4,445,800 | 5/1984 | Walker | 403/154 X |
| 4,459,945 | 7/1984 | Chatfield | 123/56 C |
| 4,500,224 | 2/1985 | Ewing | 403/343 |
| 4,594,020 | 6/1986 | Hughes | 403/343 |
| 4,596,179 | 6/1986 | Bando | 92/178 |
| 4,704,949 | 11/1987 | Foster | 92/178 X |

FOREIGN PATENT DOCUMENTS

| 594696 | 3/1960 | Canada | 384/49 |
|---|---|---|---|
| 451033 | 11/1926 | Fed. Rep. of Germany | 92/178 |
| 1945830 | 3/1971 | Fed. Rep. of Germany | 92/170 |
| 2151184 | 4/1973 | Fed. Rep. of Germany | 403/150 |
| 234907 | 4/1986 | German Democratic Rep. | 384/49 |
| 312225 | 10/1933 | Italy | 403/343 |
| 106154 | 6/1983 | Japan | 123/193 P |
| 56516 | 5/1936 | Norway | 384/49 |
| 804964 | 2/1981 | U.S.S.R. | 92/255 |
| 195109 | 3/1923 | United Kingdom | 92/178 |
| 2107822 | 5/1983 | United Kingdom | 92/178 |

Primary Examiner—Robert E. Garrett
Assistant Examiner—George Kapsalas

[57] ABSTRACT

A peristrophic internal combustion engine with increased power output has greater torque and reduced friction. The distance of rotation between the inertia weights and the crankpins is increased to increase torque. These transposed inertia weights are embodied in top and bottom journals of the connecting rods and in the pistons assemblies. Each piston assembly includes a top piston-ring-holder piston and a lower, bearing piston joined to reciprocate in the cylinder. The lower bearing piston may have a circumferential ring, cylindrical barrel rollers, or spherical ball bearing arrangement contacting the cylinder wall while the upper piston carries the piston rings. The spherical ball bearing arrangement allows lower piston rotation about the piston axis. Inner and outer cylinder liners increase the cylinder operating life and reduce combustion heat loss through the cylinder wall.

95 Claims, 5 Drawing Sheets

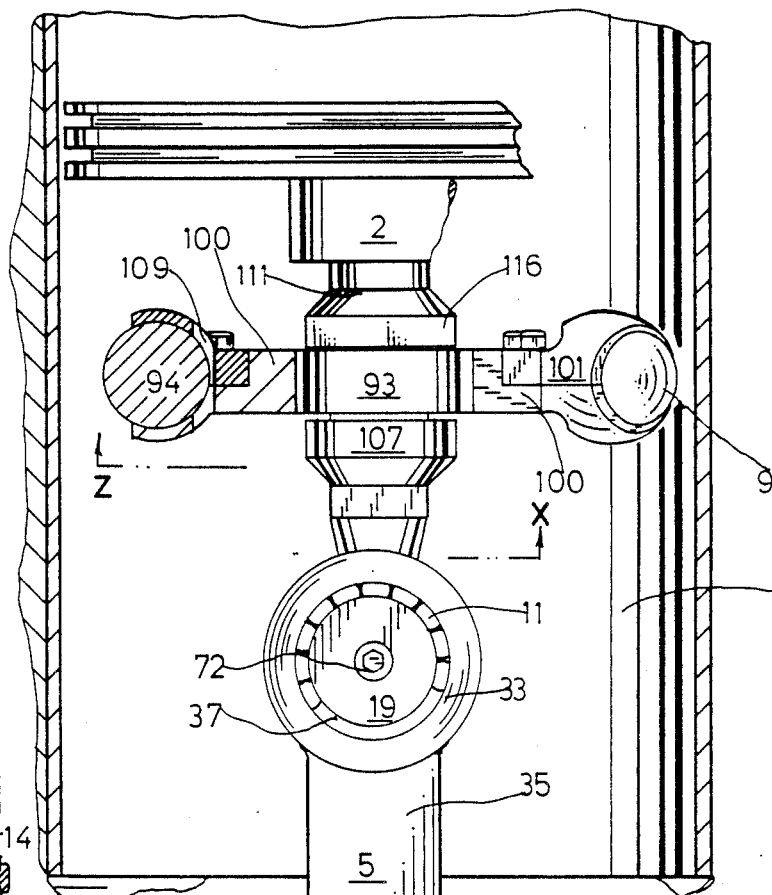
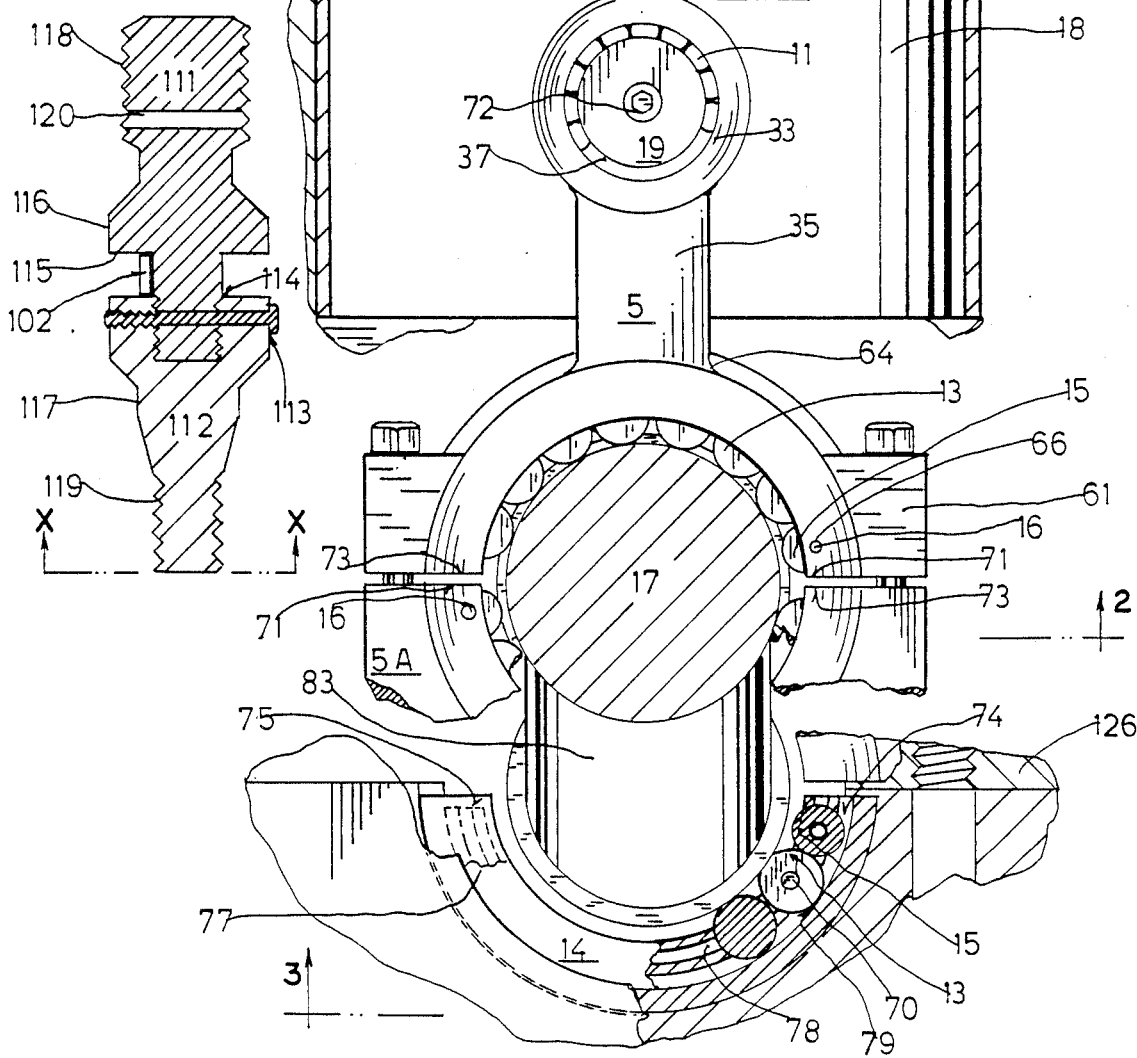

PERISTROPHIC INTERNAL COMBUSTION ENGINE ASSEMBLY AND MULTI-PART PISTONS

This Application is a continuation-in-part of my earlier application Ser. No. 769,966, filed Aug. 27, 1985, now abandoned.

BACKGROUND OF THE INVENTION

The invention relates to the field containing existing internal combustion engines with reciprocating pistons, connecting rods, and crankshafts.

Conventional internal combustion engines typically include one or more pistons in respective cylinder or cylinders. The pistons typically link to a crankshaft through respective connecting rods.

SUMMARY OF THE INVENTION

The primary object of this invention is to provide a superior internal combustion engine which reduces friction, increases torque, and provides an increased power output.

Another primary object of this invention is to produce an engine having crankshaft which is lighter and less costly to manufacture than that of existing designs and which has functions simplified to retaining the lower journal of the connecting rod and to transmitting power. Such a crankshaft reduces the weight in the engine by replacing the crankshaft mass web weights with dynamic weights in the form of spherical ball, and/or journal and cylindrical rolling bearings placed in the connecting rod journals and the lower pistons. Crankshaft ball bearings support the crankshaft on the block of the engine and eliminate thrust-bearing-induced friction.

It is an additional object of the invention to increase operational life of the internal combustion engine cylinders. To this end, an outer cylinder liner placed in the main cylinder bore reduces heat loss from the combustion chamber, and an inner cylinder liner fitted inside the bore of the outer liner provides reinforcement. The inner cylinder liner can be manufactured from a hard metal alloy.

Another primary object of the invention is to provide a connecting rod with journals forming and supporting spherical ball or cylindrical rolling bearings so as to reduce friction between the top journals and the wrist pin and also between the bottom connecting-rod journal and the crankshaft.

A further primary object of the invention is to eliminate or reduce friction between the cylinder wall and the piston skirt by eliminating the piston skirt and providing a two-part piston assembly with a top piston and a lower piston which embodies an inertia weight.

A still further primary object of the invention is to increase the torque and power output of the internal combustion engine by means of the Peristrophic Principle.

An additional object of the invention is to increase the power output of an internal combustion engine by transposition of the inertia weights from the crankshaft to the connecting rod and the lower piston of the piston assembly. As a result, smaller displacement peristrophic engines can produce the same power output as larger conventional engines. The increased torque output of the peristrophic engine allows the manufacturing of smaller size, greater efficiency engines which can contribute to energy conservation.

According to the invention, the peristrophic engine increases power output by reducing friction losses occurring in the form of heat created by friction and then diffused and conducted to the engine cooling system. The peristrophic engine transmits most of the energy created by the expanding combustion gases by means of the torque operated at the lower part of the piston assembly and transmitted to the crankpin. As a result, the engine has a low friction horsepower and higher mechanical efficiency and brake power. Thus, fuels with low calorific value, such as natural gas and hydrogen, can be used effectively.

As a feature of the invention, the crankshaft has crankpins connected by the connections between them. A connecting rod bottom journal couples with a crankpin by means of two half-ball-bearing cases embodied in the bottom journal. The connecting rod has top journals supporting the wrist pin by means of spherical ball or cylindrical journal bearings between the surface of the wrist pin and the top journals. The top and bottom journals transpose inertia weights from the crankshaft web.

As a further feature of the invention, the piston assembly is divided into two parts, comprising a top piston and a lower piston. The cylindrical top piston acts as a piston-ring holder and does not contact the cylinder. The lower piston acts as a bearing and contacts the cylinder chamber. This lower piston embodies inertia weights transposed from the crankshaft web. A first form of the lower piston comprises a triangular-cylindrical roller-bearing having rolling bodies with a circular periphery equal to that of the cylinder chamber. A second form, design $\kappa$, of the lower piston comprises a simpler and more easily fitted triangular-piston-bearing. The main advantage of the triangular-piston-bearing over the triangular-cylindrical roller-bearing is reduced cost of production. A third, design $\theta$, form of the lower piston comprises a triangular-spherical ball-bearing. The design utilizes the Peristrophic Principle and has as a main advantage over the triangular-cylindrical roller-bearing a further increase in the torque and work output for marine, diesel, and low revolution petrol engine applications.

The novel features which are believed to be characteristic of my invention are set forth with particularity in the appended claims. My invention itself, however, as to its construction, assembly, and operation, together with further objects and advantages thereof, may best be understood by reference to the following description taken in connection with the accompanying drawings.

BRIEF DESCRIPTION OF THE DRAWINGS

The drawings illustrate, by way of example, not by way of limitation, several forms of the invention which are referred to by numbers or numerals designating corresponding parts in the several views in which:

FIG. 4 shows, in end view with partial and broken section, a peristrophic engine assembly embodying a lower, triangular-spherical ball-bearing piston of design θ, and illustrates the crankshaft bearings.

FIG. 5 shows, in isolated secton, the connecting rod screw for the lower piston of design θ.

DESCRIPTION OF THE PREFERRED EMBODIMENTS

The invention, the scope of which being defined in appended claims, is not limited in this application to the details of construction and arrangement of parts shown and described, since the invention is capable of other embodiments and of being practiced or assembled in various other ways. Also, it is to be understood that the terminology or phraseology used herein is for the purpose of description and not of limitation.

The following definitions are important to an understanding of the invention:

(1) Friction Power = Indicated power − Brake power
(2) Mechanical Efficiency = Brake power/Indicated power
(3) Brake thermal efficien. = Brake power/Energy supplied The peristrophic engine described hereinafter provides a high efficiency internal combustion engine, applicable to gas or diesel engines.

Figure 1:
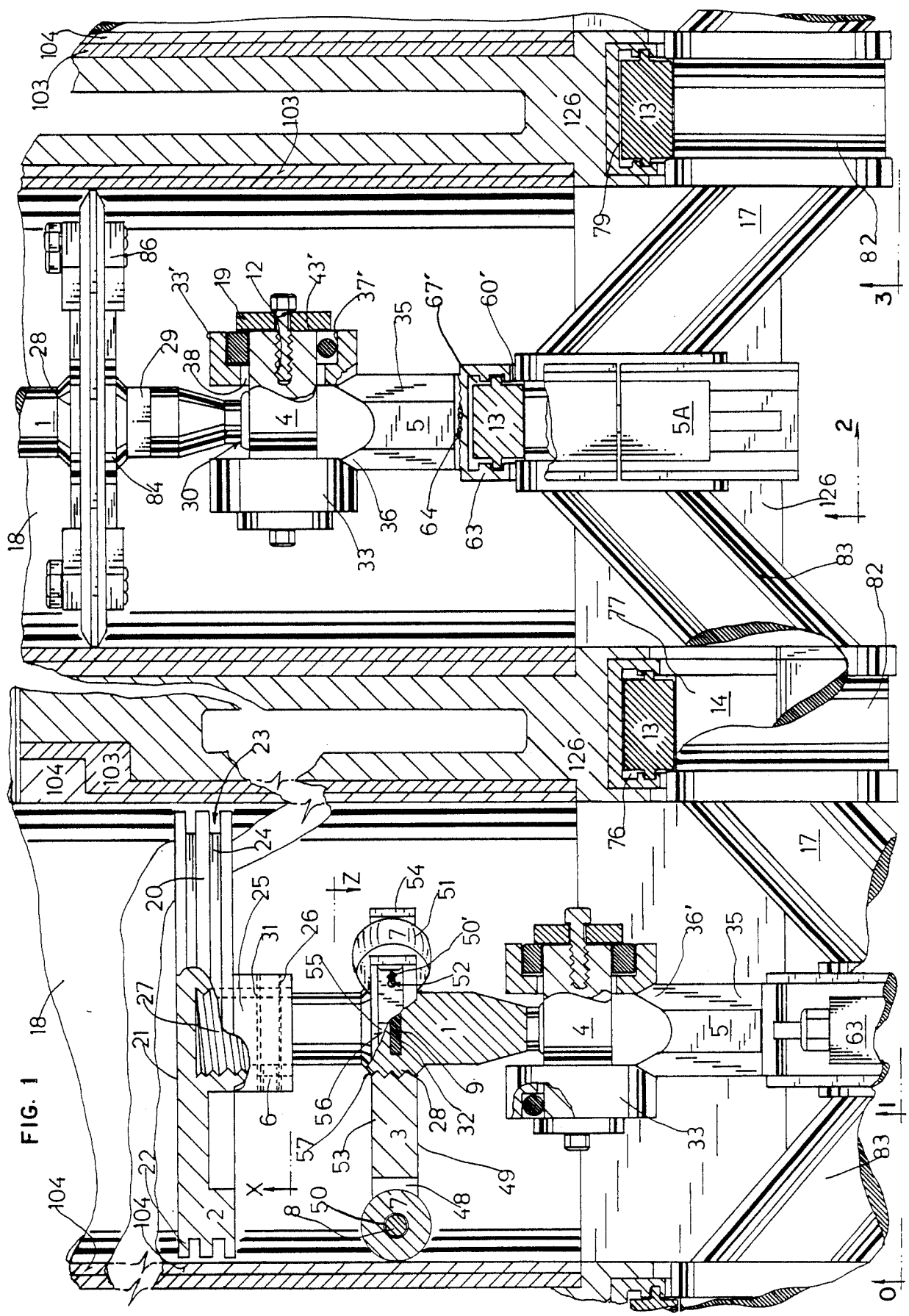
FIG. 1 shows, in side view with partial and broken section, and entire peristrophic engine assembly including crankshaft, inner and outer cylinder liners, connecting rods, and two piston assemblies, one embodying triangular-cylindrical roller-bearing as the lower piston, and the other embodying a lower piston of design $\kappa$.

FIG. 1 illustrates a reciprocating piston of an internal combustion engine. The piston is divided into two separate and independent parts comprising a top, piston-ring holder 2 and a lower piston 3. The piston-ring holder is of integral construction and comprises a cylindrical plate 20 having a flat upper surface 21 and a boundary edge 22 extending longitudinally from the periphery 24 of the cylindrical flat plate 20 to form at least one cavity 23 to hold at least one ring. The under surface extends outwardly to a center portion to form a cylindrical extension 25 with a threaded bore to receive a rod screw. The cylindrical extension 25 has a laterally located screw-receiving bore 26 for locking screw 6. As illustrated, the rod screw 1 attaches to the wrist pin 4. The body of the rod screw is threaded at intervals to receive and connect at the top end 27 to the piston ring holder. At the middle thread 28 the lower piston is attached, and at lower end 30 the wrist pin 4 is attached.

Between the middle thread 28 and the lower end 30 a square 29 is formed for a tool to engage the rod screw for assembly. The rod screw 1 has laterally located screw-receiving bores 31 and 32 to prevent disengagement during operation of the assembled parts. The stem 35 of the connecting rod 35 extends axially and divides into two top journal branches 36 and 36' to hold two identical hollow cylinders 33 and 33' spaced apart and equally separated from one another with respect to the center of stem 35. The hollow cylinders 33 and 33' form the top journals of the connecting rod 5. The hollow cylinders 33 and 33' have stepped bores 37, 38.

The bores 38, 38' are large enough so only the wrist pin can pass through so as to be pivotably supported in the top journal of the connecting rod 5. The assembly of the rod screw 1 to the wrist pin 4 and the pivotably connected wrist pin in the top journals of rod 5 are illustrated.

Figure 6:
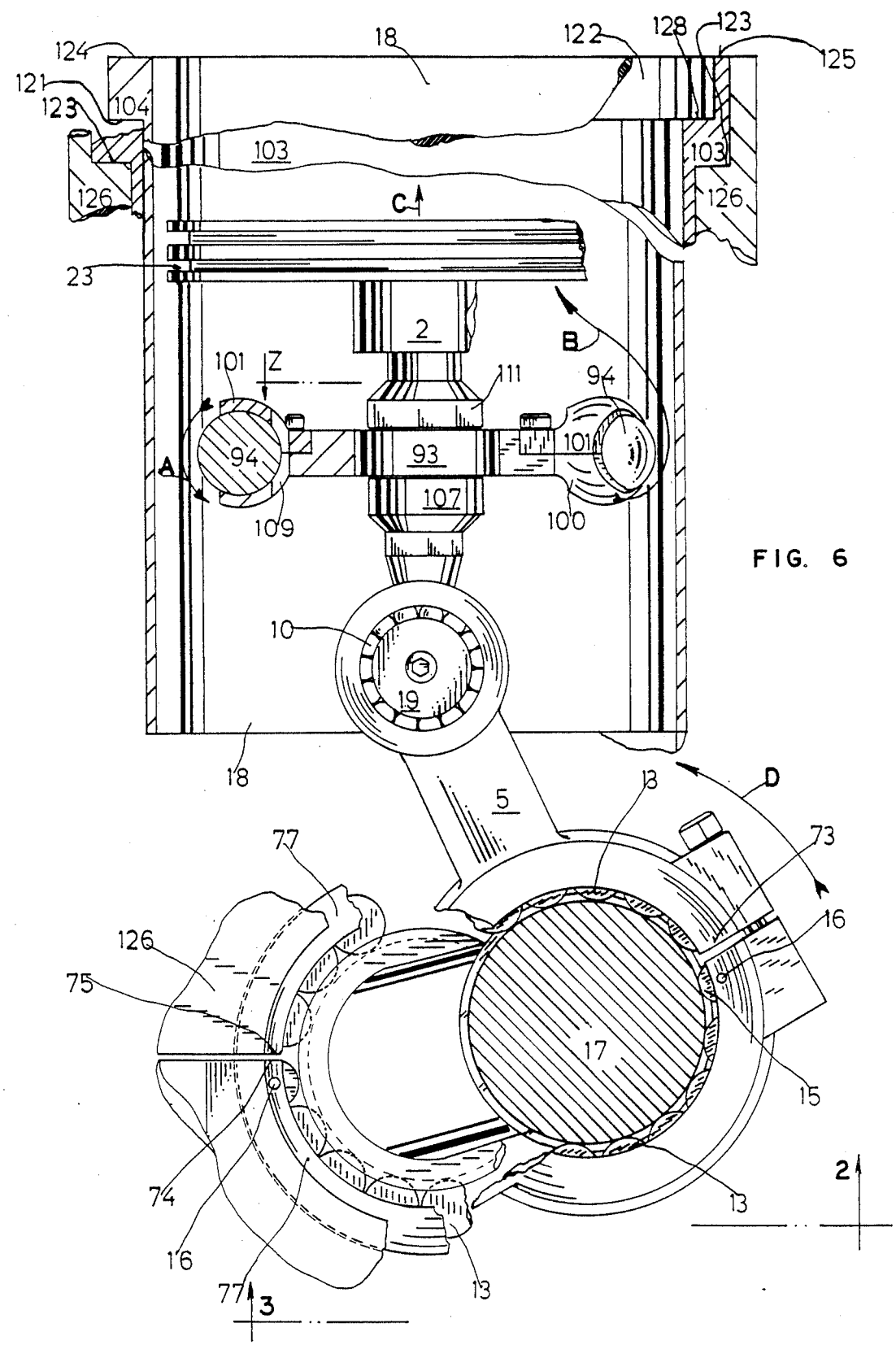
FIGS. 6 and 7 illustrate the Peristrophic Principle with a lower piston of design θ. Additionally, FIG. 7 details, in section, the inner and outer cylinder liners.

FIG. 1 also illustrates in front view the connecting rod 5 with the half bottom journal 63. The top end 64 of the outside periphery of the half bottom journal 63 is attached to stem 35 of the connecting rod 5. The half bottom journal 63 forms a case 60' identical to the case 60 (FIG. 6).

FIG. 1 illustrates an internal combustion engine reciprocating piston assembly divided into two separate and independent parts, including the top piston 2 and the lower piston supported and connected by means of rod screw 1. The piston-ring holder 2, the lower piston and the rod screw are shown in partial and broken section along their horizontal axis X—X and along the lateral axis Z—Z of the lower piston. The rod screw 1 connects and holds the piston-ring holder and triangular-cylindrical roller-bearing 3 to the wrist pin 4. The triangular-cylindrical roller-bearing, connected together with the top piston, dengages the chamber of the cylinder to secure the reciprocating horizontal motion which is necessary to take place relative to cylinder. To minimize the contact area between the lower part of the piston and the chamber of the cylinder, the triangular-cylindrical roller-bearing is designed with holders 49 each supporting a rolling cylindrical barrel bearing 7. The triangular-cylindrical roller-bearing 3 comprises a hollow cylindrical disk 55 with periphery 56 wherefrom three holders 49 extend. Each extreme end 54 of the holder 49 supports one cylindrical barrel roller 7 by means of a screw 8. A pin-receiving bore 52 is located at the edge of the screw 8. The bore 57 of the hollow cylindrical disk 55 is threaded to attach to the rod screw 1. A securing screw 9 is laterally inserted in the hollow cylinder disk 55 and the body of the rod screw 1 so as to prevent disengagement during operation. The triangular-cylindrical roller-bearing constitutes the structure of the lower piston, so that part of the inertia weights 53 are distributed to the lower piston 3 and thus transposed from the web of the crankshaft. The gap 48 is maintained between the holder 49 and cylindrical barrel roller 7. Transposition of the web weights to the lower piston 3 increases the inertia of the piston assembly and thus the torque of the peristrophic engine. The holders 49 are located at 120 degrees apart from each other to form a triangular bearing bracket. For small and medium size peristrophic engines the number of holders can be reduced to two at 180 degrees apart from each other. The extreme end 54 of the holder 49 has two bores 50 and 50'. Bore 50' is threaded. Bores 50 and 50' receive one securing screw 8 to pivotably attach the cylindrical barrel roller 7 with screw-receiving bore 58 on the extreme end 54 of the holder 49. The cylindrical barrel roller 7 has a circular periphery 51 with radius equal to that of the cylinder. Cylindrical barrel rollers 7 are the only contact between the lower piston 3 and the cylinder wall, thereby reducing friction and friction power between the triangular-cylindrical roller-bearing 3 and the cylinder liner.

FIG. 1 illustrates the crankshaft bearing 14 and the cylindrical roller bearings 13 supported in the case 77. Small gaps 76 and 79 are formed between the cylindrical roller bearings 13 and case 77 for lubricating purposes. The crankshaft bearing is lubricated in the same manner as the half ball-bearing case 5A. Stop 75 (FIG. 4) holds the first bearings in the case 77. Two crankshaft bearings 14 engage the crankpin of the crankshaft to reduce friction. The crankshaft bearing 14 is supported on the block of the engine.

Figures 2, 3:
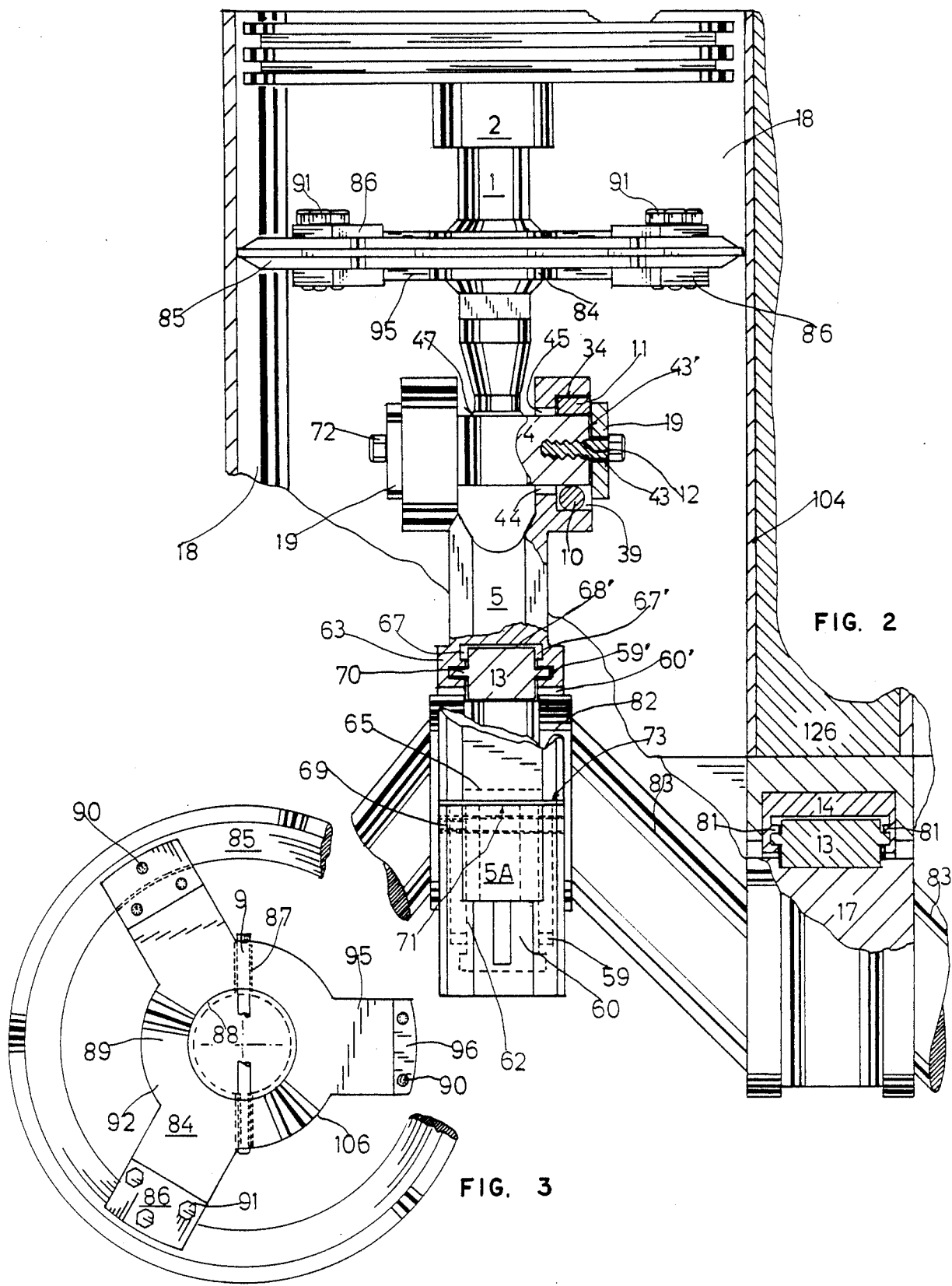
FIG. 2 shows, in side view with partial and broken section, a peristrophic engine assembly embodying a piston assembly with a lower, triangular-bearing-piston of design $\kappa$.
FIG. 3 shows a top view of the triangular-piston-bearing of design $\kappa$.

In this regard, FIG. 2 also illustrates in elevation view the half ball-bearing case 5A of the connecting rod bottom journal. The half ball-bearing case 5A is semicylindrical in shape, with an inner phieriphery forming a case 60. The case 60 has blind spots 59 formed at each inner sidewall 62 edge. The half ball-bearing case 5A is attached to the connecting rod by means of two bolt receiving extensions 61. A screw-receiving bore 69 is laterally located in the open end of the case. Illustrated in broken section are the connecting rod 5 and the cylindrical roller bearings 13 pivotably attached in the case 60' of the half bottom journal. The connecting rod 5 pivotably supports the cylindrical bearing by means of a case 60 formed by the half bottom journal 63. The cylindrical rollers 13 have an extension 70 supported in the slot 59' of the case 60'. The last cylindrical roller 15 (FIG. 4) is pivotally supported on the open end 71 of the case 60' by means of a screw attached on a screw receiving bore 66 shown in FIG. 6. The bottom journal of the connecting rod comprises two half ball-bearing cases 63 and 5A. The half ball-bearing case 5A is attached to the half bottom journal 63 to form a ball-bearing around the crankpin of the crankshaft, to reduce friction and replace the thrust bearing. The cylindrical roller bearings 13 rotate freely in the case 60'. Small gaps 67' and 68' are formed between the rollers 13 and the case 60' for lubrication purposes. The rollers 13 are inserted from the open end 71 of the case 60' and held in place by means of a stop 65 and the last roller 15 shown in FIG. 6. The cylindrical roller bearings transpose part of the web weights to the bottom journal 5A, 63 of the connecting rod 5. The hollow cylinders 33 and 33' of the top journal accommodate and hold ball 10 or journal 11 bearings in the case 39. The bearings 10, 11 rotate freely inside the case 39, and have multiple functions of holding wrist pin 4 in the bores 38 and 38', of reducing friction between the top journal and the wrist pin, and of transposing inertia weights to the top journal of the connecting rod 5. Between the wrist pin 4 and the bores 38 and 38' are located clearance gaps 44 and 45. Ball bearings 10 reduce friction to a minimum. Journal bearings 11 are cylindrical in shape to withstand large vibration, shock and load forces. The screw 72 passes through the bore 43 of the wrist-pin-washer 19 and attaches the wrist-pin-washer 19 on the screw-receiving bore 12 on the base 43' of the wrist pin 4. The wrist-pin-washers 19 and 19' hold the bearings 10, 11 in the cases 34, 39 and retain the wrist pin 4 in the top journal of the connecting rod 5. At bore 47 the lower end 30 of the rod screw 1 is attached. The partial transposition of the inertia weights from the web of the crankshaft to the top and bottom journals of the connecting rod in conjunction with the reduction in friction with the use of bearings 10, 11, 13, 15 increases the torque and power of the peristrophic engine.

Furthermore, FIG. 2 illustrates the preferred embodiment of the design κ of the lower piston. The triangular-piston-bearing 85 has piston holders 86 connected to the triangular bearing bracket 84.

FIG. 3 also illustrates, in isolation, the lower piston of design κ. The triangular-piston-bearing 84 comprises a hollow cylindrical disk 92 with periphery 106 wherefrom at least two holders 95 extend to form a bearing bracket. The holder 95 extreme ends 96 support at least one ring 85 of integral construction by means of at least two piston holders each with at least two screws 91. The hollow cylindrical disk bore 88 is threaded to attach to the rod screw 1. A securing screw 9 is laterally attached to the hollow cylindrical disk 92 securing screw-receiving bore 87 and the rod screw securing screw-receiving bore 31. The triangular-piston-bearing 84 constitutes a lower piston whereto part of the inertia weights 89 are transposed. The connecting rod 5 also embodies transposed inertia weights. The triangular-piston-bearing 84 is firmly joined with the top piston 2 acting as ring-holder so as to secure the horizontal reciprocating motion inside the cylinder chamber. The connecting rod 5 is coupled with the crankshaft 17. The number of holders 95 is increased to at least three to form a triangular-bearing bracket for large peristrophic engines and reduced with at least two holders 95 for medium and small size peristrophic engines. The holder 95 extended edges 96 each have at least one bore 90 to receive at least one securing screw 91. A ring 85 is attached on the extreme ends 96 of the triangular-piston-bearing 84 by means of the piston holders 86. Only the ring contacts the cylinder wall 18. The lower piston 84 is adjacently and conjointly attached between the top piston 2 and the connecting rod 5. The top piston 2 together with the lower piston 84 are attached to the rod screw 1 to form a reciprocating piston assembly for the peristrophic engine.

FIG. 4 illustrates, the embodiment of the design θ of the lower piston. The connecting rod 5 again is shown. The top end 64 of the bottom journal connects to stem 35. The extensions 61 receive bolts. The crankshaft bearing 14, shown in end view, holds the last cylindrical roller 15 on the case 77. The last cylindrical roller 15 is pivotably attached on the case 77 by means of a screw 16. The cylindrical roller 15 rotates freely about the axis of the screw 16 and simultaneously holds the cylindrical roller bearings 13 in the case 77 in conjunction with the stop 75. The rod screw 107 of the design θ accommodates the bearings 102 (FIG. 5) which reduce friction between freely rotatable triangular-spherical ball-bearing 93 and the rod screw of the design θ.

Figure 7:
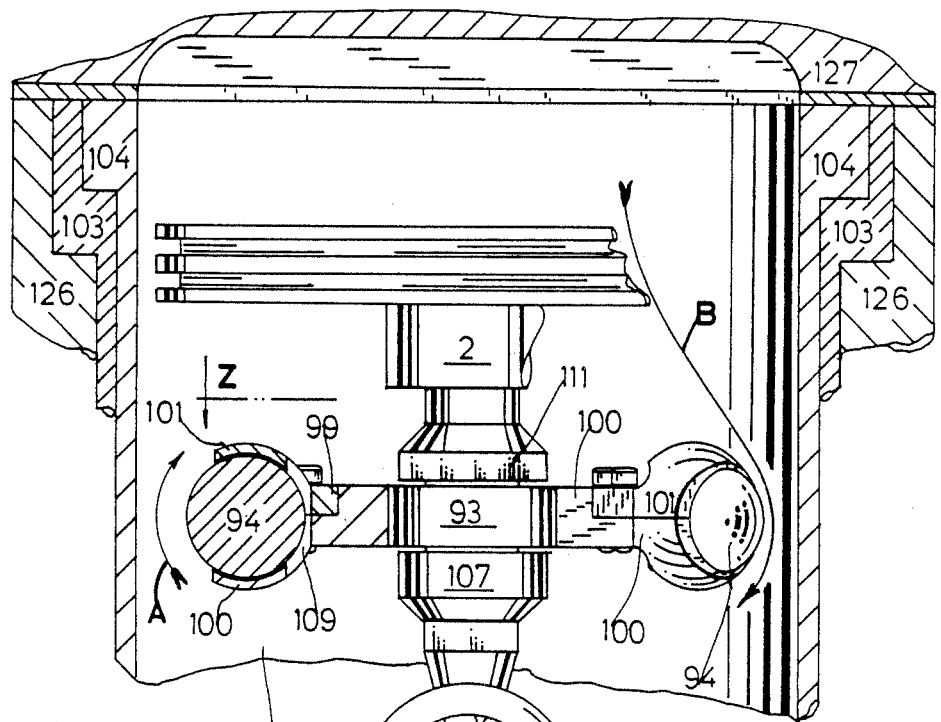

FIG. 5 illustrates the rod screw in detailed section view. The wrist pin 4 is connected to the rod screw 107 by means of a threaded bore 47 located at middle position of the wrist pin body (FIG. 7). The rod screw 107 is divided into two parts, the upper rod screw 111 and the lower rod screw 112. The upper rod screw 111 is attached to the top piston 2 and the lower rod screw 112 is attached to the wrist pin 4. The lower rod screw 112 has a threaded bore 114 to receive the upper rod screw. The threaded bore 114 has a bore 113 receiving a laterally located screw to prevent disengagement during operation. The upper and lower rod screw 111, 112 main bodies form a cylindrical extension 115 engaging the triangular-spherical ball-bearing 93 to restrict any motion other than rotary (circular) motion about the rod screw 107 axis. A cube 116 is formed between the threaded end 118 and the cylindrical extension 115 so a tool can be attached. Another cube 117 is formed between the threaded end 119 and threaded bore 114 to allow a tool to be attached. A securing screw 9 is inserted laterally in the receiving bore 120 of the rod screw.

Figure 8:
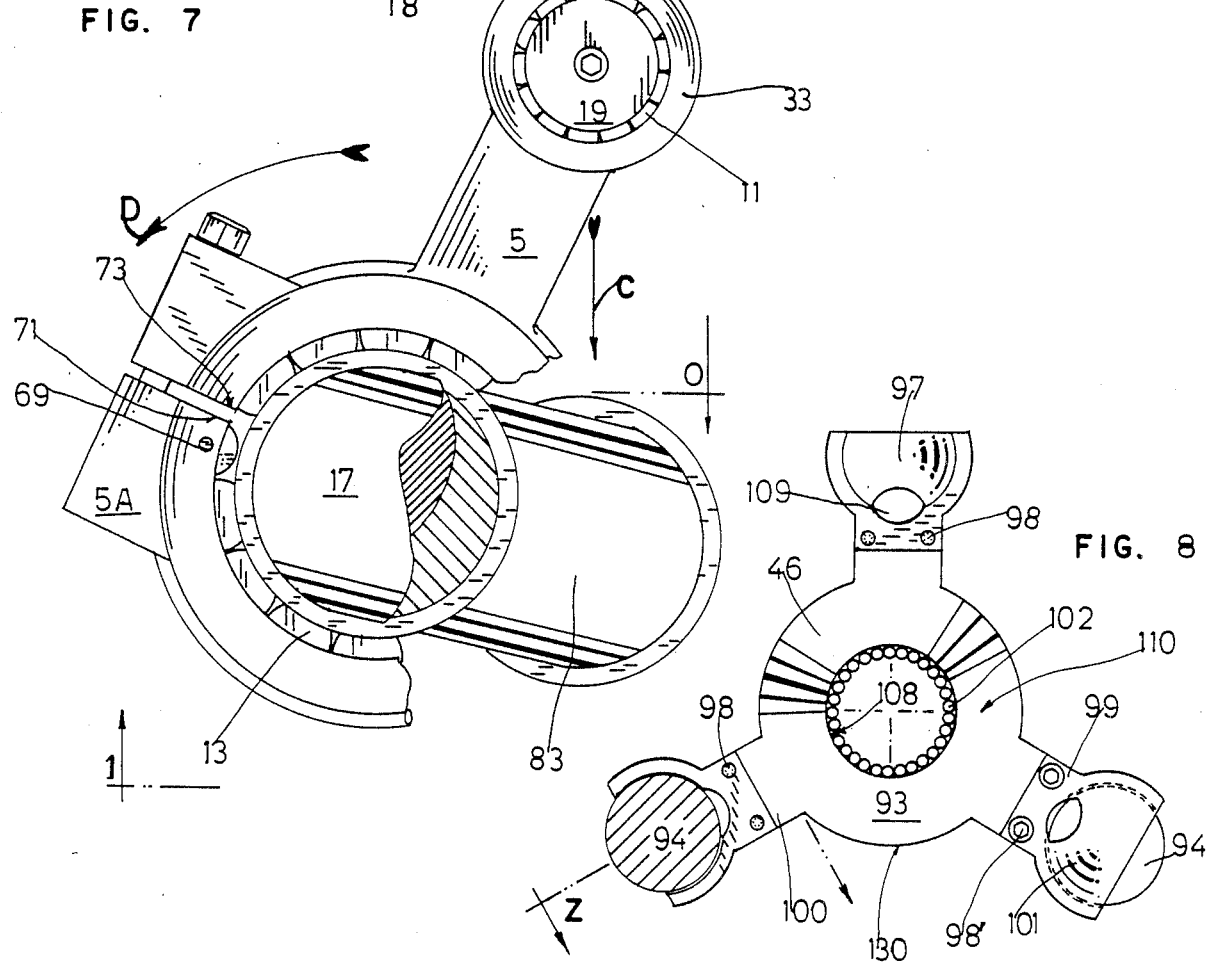
FIG. 8 shows a top view, in partial section, of the triangular-spherical ball-bearing of design θ.

FIG. 8 illustrates the triangular-spherical ball-bearing 93 of design θ in detail. The triangular-spherical ball-bearing 93 rotates and reciprocates in conjunction with the reciprocation of top piston 2 to form a reciprocating piston assembly for the peristrophic engine. The triangular-spherical ball-bearing 93 forms the lower piston. The lower piston 93 forms interval interrupted ball bearings attached between the top piston 2 and the connecting rod 5. The rod screw 107 of the design θ connects the top 2 and lower 93 pistons. The lower piston 93 has a hollow cylindrical disk 46 with periphery 130 wherefrom at least two holders 100 extend to form a bearing bracket. The holder 100 extreme ends 101 each support at least one peristrophic spherical ball 94 by means of a spherical holder 101. The hollow cylindrical disk 46 bore 108 accommodates the bearings 102. The triangular-spherical ball-bearing 93 embodies transposed inertia weights 110 embodied in the hollow cylindrical disk 46 and the peristrophic balls 94. The triangular-spherical ball-bearing 93 rotates freely about its axis clockwise and counterclockwise. This rotation and the transposition of the inertia weights to the triangular-spherical ball-bearing 93 increases the torque and work output of the peristrophic engine. The holders 100 are increased to at least three for large peristrophic engines thus forming a triangular bearing bracket, and reduced with at least two holders 100 for medium and small size peristrophic engines. The outer end of the holder 100 is extended to form a case 97 and a lubrication gap 109 whereinto at least one peristrophic sphere 94 is accommodated and supported. Thus, with the inertia weights transposed from the crankshaft to the connecting rod 5 and to the triangular-spherical ball-bearing 93 the torque and work output of the peristrophic engine increase. The crankshaft 17 constitutes only crankpins 82 and connections 83 between the crankpins. The crankshaft can be embodied with only a part of the inertia weights; the remaining weights are partially distributed and supported by means of the triangular-spherical ball-bearing 93 and the connecting rod 5. The peristrophic sphere 94 is attached to each holder's 100 extreme end 97 by means of a spherical holder 101. The peristrophic spheres 94 are spherical in shape and are the only contact between the lower piston 93 and the cylinder wall, thereby reducing friction. The spherical holder 101 is so shaped to allow lubrication and sufficient contact of the peristrophic spheres 94 with the cylinder wall 18. The spherical holder 101 one end is semi-spherical in shape to hold the peristrophic spheres 94 while the other end extends to a cube 99 to be attached to the holder 100 at bores 98 of the triangular-spherical ball-bearing 93 by means of at least two screws 98'.

FIGS. 6 and 7 are similar to FIG. 4 and show the peristrophic engine with the lower piston of design θ which utilizes the Peristrophic Principle to create a peristrophic effect, as described in more detail below. Also to be noted are that FIG. 6 illustrates in end view the half ball-bearing case accommodating and holding the cylindrical roller bearings in the case 60. The rollers 13 are in end view. Small gaps 67 and 68 are formed between the cylindrical rollers and the case 60 for lubrication. Deflection of the extension 70 of the cylindrical roller bearing 13 due to the applied load from the crankpin causes a hydraulic pressure forcing the lubricant out of the gaps 67 and 68 into the case 60 and simultaneously preventing fracture of the extension 70 by creating a reaction force to the cylindrical roller to the load applied by the crankpin. The above theory applies to the case 63 of the half bottom journal of the connected rod (FIG. 7).

FIGS. 1, 4 and 6 also illustrates in end view the crankshaft bearing 14. The crankshaft bearing 14 is identical to the half ball-bearing case 5A without bolt receiving extensions 61. The crankshaft bearing 14 is semicylindrical in shape with an inner periphery forming a case 77, having a slot 78 formed at each inner sidewall 81 edge extending from the open end of the case 74 to the closed end 75 of the case 77 periphery. A screw-receiving bore 80 is lateraly located in the open end 74 of the case 77 to support the last cylindrical roller bearing 15 on the walls of the case 77 by means of a screw. Also to be noted is that FIG. 7 illustrates in end view the half ball-bearing case 5A of the connecting rod bottom journal. A screw-receiving bore 69 is laterally located into the open end 71 of the case 60. Closed end 73 is preferrably connected to the open end 71 of the half bottom journal 63 of the connecting rod 5. Bolt-receiving extensions 61 are embodied on the case outside the periphery extreme ends.

DETAILED DESCRIPTION OF THE PERISTROPHIC PRINCIPLE

The following abbreviations appear in the description given below:
(1) counterclockwise=ACW
(2) clockwise=CW
(3) top dead center=TDC
(4) bottom dead center=BDC
(5) peristrophic spheres=PS
(6) triangular-spherical ball-bearing=TSB The application of the Peristrophic Principle is based on the TSB.

(a) During the intake stroke the piston assembly moves from TDC to BDC (downward motion), causing a CW rotation and downwards motion of the PS due to friction of the PS with cylinder, shown in the FIG. 7, motion A.

This CW motion of the PS creates an angular momentum which causes the TSB to rotate from left to right, leftward motion B, as shown in FIG. 7.

These coupling forces and the angular momentum create forces acting downwards, force C, from the rod screw onto the crankshaft, force D.

This peristrophic effect results in an increase of the torque and work output of the engine (petrol or diesel engines).

(b) During the motion of the piston from BDC to TDC (upwards motion) the PS rotate ACW as is shown in the FIG. 6 motion A. This ACW motion of the PS creates an angular momentum causing the TSB to rotate from right to left, rightwards motion B as shown in FIG. 6.

These coupling forces and angular momentum create forces acting upwards, force C, on the top piston 2 to give a high compression ratio. This peristrophic effect of the PS and TSB results in an increase of the torque and the work output of the internal combustion engines.

(c) At BDC lowest point the downwards motion of the top piston 2 will stop and will change to upwards motion. This creates tension forces which have as an effect a change in the direction of rotation of triangular-spherical ball-bearing 93.

Also the change of direction of movement of the top piston 2 together with the change of rotation of the PS create tensions and angular momentum causing the TSB to change direction of rotation from left to right when the upward motion is starting and right to left when the downwards motion is starting (FIG. 7). The rotation of the TSB increases the dynamic effect which the weights have on the engine by creating couplings and angular momentums. The torque is also increased by increasing the radius of rotation of the crankshaft weights by transposing part or all the crankshaft weights on the connecting rod and the lower part of the piston.

(d) The torque is increased by increasing the distance between the weights (web weights) of the crankshaft and the axis of rotation of the crankshaft. The weights are transposed on the connecting rod 5 and its extreme ends as cylindrical roller bearings 13, 15 and bearings 10, 11. These bearings have a double function, the transposition of crankshaft weights and the reduction of friction on the moving parts of the connecting rod and crankshaft 17. The inertia which is necessary for the continuation of the reciprocation of the piston is transposed to the triangular-cylindrical roller-bearing 3 or triangular-piston-bearing 84 or the triangular-spherical ball-bearing 93 (lower piston) with functioning based on the Principle of Conservation of Energy.

MANUFACTURING PROCESS

The manufacturing process and materials described is by no means to limit the specification of the invention given, but the peristrophic engine may be constructed in all sorts of shapes and dimensions without going beyond the scope of the invention:

(1) Top piston can be sand cast, or pressure die cast. Material: Aluminium alloy, Zn 5.8%, Mg 2.5%, Cu 1.4%, Mn 0.15%, Cr 0.7%.

(2) Triangular-cylindrical roller-bearing case can be cast. Material: Same as used for top piston.

(3) Rod screw should be machined. Material: 0.4% carbon steel.

(4) Connecting rod can be cast. Material: Same as used for rod screw.

(5) Wrist pin can be manufactured by machining. Material: 0.4% carbon steel.

(6) Bearings 10, 11, 13, 15, 17 can be forged. Material: Chrome steel with 15% Chrome in the alloy.

(7) Crankshaft is forged. Material: Carbon steel.

(8) Triangular-spherical ball-bearing can be manufactured by pressure die casting or casting. Material: Carbon steel with 0.4% C. content in Carbon.

(9) Spherical holders are cast or pressure die cast. Material: Carbon steel with 0.4% C. content in Carbon.

(10) Bearings (102) can be cast or pressure die cast or forged. Material: Carbon steel with 15% Cr. content in Chromium.

(11) Triangular-piston-bearing can be cast or pressure die cast.

(12) Ring 85 can be forged. Material: steel with 15% Cr content.

(13) Piston holder can be machined. Material: 0.4% carbon steel.

(14) Outer cylinder liner can be manufactured by pressure and deep drawing. Material: Alloy carbon steel, 0.16% C, 12.5% Cr.

(15) Inner cylinder liner can be manufactured by pressure and deep drawing. Material: Alloy carbon steel, 0.08% C, 0.3% Ti, 5.0% Mo, 9.0% Co, 18% Ni.

Further to be noted is that FIGS. 1, 6, and 7 illustrate the inner cylinder liner 104 and outer cylinder liner 103 in section. The inner cylinder liner is made from hard alloy metal to extend the operation life of the cylinder chamber 18. An outward extension 121 is located at the top end 124 of the inner liner. The outer liner 103 is made from alloy metal which has a low thermal conductivity factor so that it can reduce the heat loss through the inner liner 104 after combustion. The outer liner 103 has an outward receiving extension 122 at the top end 125. The bottom base 123 engages the chamber bore 126 of the block of the engine. The extension 122 engages the base 128 of the receiving extension 122. The cylinder head block 127 is attached to the block of the engine holding fixed the inner and outer liners 104, 103 in the chamber bore 126.

Although the preferred embodiments of this invention have been shown and described in detail, it is recognized that the invention is not limited to the precise form and structure shown and various modifications and rearrangements as will occur to those skilled in the art upon full comprehension of this invention may be resorted to without departing from the scope of the invention as defined in the claims.

I claim:

1. A piston apparatus comprising:
   a plurality of pistons,
   connecting means for connecting said pistons along a common axis, and,
   at least one of said pistons being a triangular-spherical ball-bearing adapted for free rotation around said common axis in order to create a peristrophic effect according to the Peristrophic Principle.

2. A piston apparatus according to claim 1 in which:
   said plurality of pistons includes a cylindrical top piston, and a lower piston, said lower piston being a triangular-spherical ball-bearing.

3. A piston apparatus according to claim 1 in which:
   said top piston is a piston-ring holder.

4. A piston apparatus according to claim 3 in which:
   said piston-ring holder includes an upper surface and a boundary edge extending axially from the periphery of said upper surface,
   said boundary edge having at least one cavity to hold at least one piston ring.

5. A piston apparatus according to claim 1 in which:
   said triangular-spherical ball-bearing includes a central hollow portion with a periphery from which a plurality of holders extend in order to form a bearing bracket.

6. A piston apparatus according to claim 5 in which:
   each holder of said plurality of holders has an outer end supporting at least one respective peristrophic spherical ball retained by respective spherical holder means.

7. A piston apparatus according to claim 6 in which:
   each said spherical holder means has one end which is semispherical in shape to hold said at least one respective peristrophic spherical ball, and another extending end adapted to attach to the respective holder of said plurality of holders by fastening means.

8. A piston apparatus according to claim 7 in which:
   said fastening means includes at least one threaded fastener.

9. A piston apparatus according to claim 7 in which:
   each holder of said plurality of holders includes respective case means for accommodating and supporting said at least one respective peristrophic sphere at its respective outer end.

10. A piston apparatus according to claim 9 and further comprising:
    lubrication gaps in said case means.

11. A piston apparatus according to claim 5 in which:
    each holder of said plurality of holders has an outer end with case means for supporting at least one respective peristrophic spherical ball.

12. A piston apparatus according to claim 11 and further comprising:

lubrication gaps in said case means.

13. A piston apparatus according to claim 1 in which:
said plurality of pistons includes a cylindrical top piston and a lower piston;
said top piston having an upper surface, an axially extending boundary edge, and a lower surface extending radially from said boundary edge, said lower surface having means for connecting to said connecting means connecting said pistons along the common axis;
said lower piston being a triangular-spherical ball-bearing including a central hollow portion with a periphery from which a plurality of holders extend to form a bearing bracket.

14. A piston apparatus according to claim 13 in which:
each holder of said plurality of holders has an outer end supporting at least one respective peristrophic spherical ball retained by respective spherical holder means.

15. A piston apparatus according to claim 14 in which:
each said spherical holder means has one end which is semispherical in shape to hold said at least one respective peristrophic spherical ball, and another extending end adapted to attach to the respective holder of said plurality of holders by fastening means.

16. A piston apparatus according to claim 15 in which:
said fastening means includes at least one threaded fastener.

17. A piston apparatus according to claim 15 in which:
each holder of said plurality of holders includes respective case means for accommodating and supporting said at least one respective peristrophic spherical ball at its respective outer end.

18. A piston apparatus according to claim 17 and further comprising:
lubrication gaps in said case means.

19. A piston apparatus according to claim 13 in which:
each holder of said plurality of holders has an outer end with case means for supporting at least one respective peristrophic spherical ball.

20. A piston apparatus according to claim 19 and further comprising:
lubrication gaps in said case means.

21. A piston apparatus according to claim 13 in which:
said connecting means to connect said pistons along the said common axis comprises rod screw means adapted to connect at a top end to said lower surface connecting means.

22. A piston apparatus according to claim 21 and further comprising:
a threaded joint for connecting said rod screw means and said lower surface connecting means.

23. A piston apparatus according to claim 21 in which:
said top end of said rod screw means has threads, and,
said lower surface connecting means is a threaded cylindrical extension adapted for assembly with said threaded top end of said rod screw means.

24. A piston apparatus according to claim 23 and further comprising:
lateral bore means in said cylindrical extension and said top end of said rod screw means,
said lateral bore means adapted to align at assembly and to receive laterally inserted securing means which prevents disassembly of said rod screw means and said top piston.

25. A piston apparatus according to claim 24 in which:
said laterally inserted securing means is a securing screw.

26. A piston apparatus according to claim 21 and further comprising:
a wrist pin and connecting means to connect said wrist pin to a lower portion of said rod screw means.

27. A piston apparatus according to claim 26 and further comprising:
a threaded joint forming said connecting means to connect said lower portion of said rod screw and said wrist pin.

28. A piston apparatus according to claim 27 in which:
said threaded joint includes a threaded portion in said wrist pin and threads on said rod screw means lower portion whereby said wrist pin and said rod screw means are connected.

29. A piston apparatus according to claim 21 in which:
said rod screw means has a peripheral annular recess defining a reduced diameter portion which is received in said hollow portion, said annular recess thereby retaining said triangular-spherical ball-bearing and constraining its relative motion primarily to rotation about said common axis.

30. A piston apparatus according to claim 29 and further comprising;
bearing means for reducing friction between said freely rotatable triangular-spherical ball-bearing and said rod screw means.

31. A piston apparatus according to claim 30 in which:
said bearing means includes rolling bearing elements disposed between an exterior periphery of said annular recess and said hollow portion of said cylindrical disk.

32. A piston apparatus according to claim 21 and further comprising:
an upper rod screw forming said top end of said rod screw means, and a lower rod screw;
said upper and lower rod screws adapted to be connected together to form said rod screw means.

33. A piston apparatus according to claim 32 and further comprising:
a first threaded joint connecting means adapted to connect said upper rod screw to said lower surface connecting means; and,
a second threaded joint connecting means adapted to connect a wrist pin to said lower rod screw.

34. A piston apparatus according to claim 32 and further comprising:
a threaded joint for connecting said upper and lower rod screws.

35. A piston apparatus according to claim 34 and further comprising:
lateral bore means at said threaded joint, said lateral bore means adapted to receive at assembly of said threaded joint laterally inserted securing means which prevents disassembly of said threaded joint.

36. A piston apparatus according to claim 34 and further comprising:
a peripheral annular recess formed proximately to said threaded joint, said annular recess defining a reduced diameter portion of said rod screw means, said annular recess adapted to retain said freely rotatable triangular-spherical ball-bearing and to constrain its relative motion primarily to rotation about said common axis.

37. A piston apparatus according to claim 36 and further comprising:
rolling element bearing means disposed between an exterior periphery of said annular recess and said hollow of said cylindrical disk for reducing friction between said freely rotatable triangular-spherical ball-bearing and said rod screw means.

38. A piston apparatus comprising:
a cylindrical top piston,
said cylindrical top piston being a piston-ring holder with an upper surface, an axially extending boundary edge having at least one cavity therein to retain at least one piston ring, and with a lower surface extending radially from said boundary edge,
said lower surface having a threaded cylindrical extension,
said threaded cylindrical extension adapted to form a first threaded joint with a top end of an upper rod screw,
said upper rod screw at a bottom end thereof forming one end of a peripheral annular recess defining a reduced diameter portion,
said upper rod screw bottom end having a threaded portion adapted to form another threaded joint with a lower rod screw top end, said lower rod screw top end forming a second end of said peripheral annular recess when said upper and lower rod screws are joined; and,
a lower piston adapted for connection to said cylindrical top piston on a common axis by said upper and lower rod screws,
said lower piston being a triangular-spherical ball-bearing including a central hollow portion with a periphery from which a plurality of bearing-bracket-forming holders extend each with an outer end supporting at least one respective peristrophic spherical ball retained by a spherical holder means and case means; and,
said peripheral cylindrical annular recess receiving said central hollow portion in assembly so as to retain said triangular-spherical ball-bearing and to constrain its relative motion primarily to rotation about said common axis in order to create a peristrophic effect according to the Peristrophic Principle.

39. A piston apparatus comprising:
a plurality of pistons;
connecting means for connecting said pistons along a common axis; with,
at least one of said pistons adapted for free rotation around said common axis in order to create a peristrophic effect according to the Peristrophic Principle.

40. A triangular-spherical ball-bearing, for use in a reciprocating piston assembly, comprising:
a central portion with a periphery from which a plurality of holders extend to form a bearing bracket, said holders each having a respective outer end which supports at least one respective peristrophic spherical ball.

41. A triangular-spherical ball-bearing according to claim 40 in which:
each said holder outer end extends to case means for accommodating and supporting said at least one peristrophic spherical ball.

42. A triangular-spherical ball-bearing according to claim 41 and further comprising:
lubrication gaps in said case means.

43. A triangular-spherical ball-bearing according to claim 41 and further comprising:
respective spherical holder means located at each said holder outer end for retaining said at least one respective peristrophic spherical ball.

44. A triangular-spherical ball-bearing according to claim 43 in which:
each said spherical holder means has one end which is semispherical in shape so as to hold said at least one respective peristrophic spherical ball; and,
another extending end adapted to attach to the respective holder of said plurality of holders.

45. A triangular-spherical ball-bearing according to claim 44 and further comprising:
fastening means for attaching said other extending end of said spherical holder means to the respective holder.

46. A traingular-spherical ball-bearing according to claim 45 in which:
said fastening means includes at least one threaded fastener.

47. A triangular-spherical ball-bearing according to claim 45 in which:
said bearing bracket has two holders.

48. A triangular-spherical ball-bearing according to claim 45 in which:
said bearing bracket has three holders.

49. A traingular-spherical ball-bearing, for use in a reciprocating piston assembly comprising:
a central hollow cylindrical disk with an outer periphery from which three holders extend radially to form a triangular bearing bracket;
said holders having respective radially outer ends which each support at least one respective peristrophic spherical ball in a respective case; and,
a respective spherical holder located at each of said three holder outer ends;
said spherical holders each having one respective semispherical end holding said at least one respective peristrophic spherical ball, and another extending end connected to the respective holder;
said cases and holders allowing free rotation of said peristrophic spherical balls.

50. A rod screw assembly, for connecting pistons in a piston assembly, comprising:
an upper rod screw portion having, a threaded to end, a middle section with peripheral cube means which allows attachment of a tool to facilitate assembly and disassembly, and a reduced diameter bottom section extending to a threaded lower end; and,
a lower rod screw portion having a threaded top end, a middle section with peripheral cube means which allows attachment of another tool to facilitate assembly and disassembly, and a bottom section extending to a threaded lower end;
said upper rod screw portion and said lowerrod screw portion connecting, in assembly, through a threaded joint formed by said threaded lower end of said upper rod screw portion and said threaded top end of said lower rod screw; and, a peripheral annular recess located proximately to said threaded joint.

51. A rod screw assembly according to claim 50 in which:

said upper rod screw lower end has external threads, and, said lower rod screw top end has internal threads, said internal threads receiving said external threads in assembly to form said threaded joint.

52. A rod screw assembly according to claim 50 and further comprising:

lateral bore means at said threaded joint, said lateral bore means adapted to receive at assembly of said threaded joint laterally inserted securing means which prevents disassembly of said threaded joint.

53. A peristrophic combustion engine comprising:

at least one cylinder;

a reciprocable piston assembly disposed in said at least one cylinder, said piston assembly comprising a plurality of pistons with at least a top piston and a lower piston;

rod screw means for connecting said top piston and said lower piston along a common axis so that they receiprocate together; and, connecting rod means adapted to connect said rod screw and said receiprocable piston assembly to a rotatable crankshaft; wherein, at least said lower piston is freely rotatable about said axis, inside said at least one cylinder, so as to create a peristrophic effect according to the Peristrophic Principle when the top and lower pistons reciprocate.

54. A peristrophic combustion engine according to claim 53 in which:

said top piston is a piston-ring holder with an upper surface and a boundary edge extending axially from a periphery of said upper surface, said boundary edge having at least one cavity to hold at least one piston ring.

55. A peristrophic combustion engine according to claim 53 and further comprising:

a triangular-spherical ball-bearing forming said lower piston and including a central hollow portion with a periphery from which a plurality of bearing-bracket-forming holders extend each with an outer end supporting at least one respective peristrophic spherical ball in contact with a wall of said at least one cylinder; wherein, said triangular-spherical ball-bearing with said peristrophic spherical balls enbodies transposed inertia weights which increase the torque and work output of the peristrophic engine.

56. A peristrophic combustion engine according to claim 55 and further comprising:

an inner liner and an outer liner in said at least one cylinder.

57. A peristrophic combustion engine according to claim 56 in which:

said inner liner defines said cylinder wall, and, said outer liner surrounds said inner liner.

58. A peristrophic combustion engine according to claim 57 in which:

said inner liner is made from hard alloy metal so as to extend the operational life of said at least one cylinder and, said outer liner is made from alloy metal having a low thermal conductivity so as to reduce heat loss through said cylinder wall.

59. A peristrophic combustion engine according to claim 53 and further comprising:

a wrist pin operatively connected to said rod screw means, said wrist pin being pivotably disposed in a pin bore formed in journal means adapted for operatively linking said connecting rod means and said rod screw.

60. A peristrophic combustion engine according to claim 59 and further comprising:

a top journal portion integral with said connecting rod means, said top journal portion forming said journal means; and, two hollow cylinders spaced apart along a mutual axis and equally separated with respect to a center of a stem of said connecting rod means, said hollow cylinders forming two top journals of said top journal portion of said connecting rod means, said top journals said pivotably disposed wrist pin; and, bearing means for reducing friction between said wrist pin and said top journals.

61. A peristrophic combustion engine according to claim 60 in which:

said bearing means includes rolling bearing elements disposed between said journals and said wrist pin, said rolling bearing elements having multiple functions, including transposing inertia weights to said top journal portion of said connecting rod means.

62. A peristrophic combustion engine according to claim 61 and further comprising:

wrist-pin-washer means adapted to hold rolling bearing elements in said top journals and retain said wrist pin in said pin bore.

63. A peristrophic combustion engine according to claim 59 and further comprising:

a stem portion forming part of said connecting rod means, said stem portion connected at an upper end to said top journal portion and connected at a lower end to a half bottom journal;

said half bottom journal having case means retaining rolling bearing means disposed between said half bottom journal and said rotatable crankshaft, said rolling bearing means replacing at least part of the crankshaft mass web weights and transposing at least part of the web weights to said lower end of said connecting rod means.

64. A peristrophic combustion engine according to claim 63 and further comprising:

half bearing case means connected to said half bottom journal in order to retain said rolling bearing means.

65. A peristrophic combustion engine comprising:

at least one cylinder, said cylinder having an inner liner and an outer liner;

a receiprocable piston assembly disposed in said at least one cylinder, said piston assembly including a cylindrical top piston with upper surface, with an axially extending boundary edge, and with a lower surface extending radially from said boundary edge;

said lower surface having cylindrical extension means adapted to form a first threaded joint with a top end of a rod screw;

said rod screw having a peripheral annular recess defining a reduced diameter portion which retains a lower piston;

said lower piston being a triangular-spherical ball bearing including a central hollow portion with a periphery from which a plurality of bearing-bracket-forming holders extend each with an outer end supporting at least one respective peristrophic spherical ball in contact with a wall of said at least one cylinder so as to create a peristrophic effect according to the Peristrophic Principle when said top and lower pistons reciprocate, said peristrophic spherical balls and said triangular-spherical ball-bearing embodying transposed inertia weights which increase the torque and work output of the peristrophic engine; and, a wrist pin operatively connected to said rod screw so as to be pivotably disposed in a pin bore formed in journal means adapted for operatively linking a connecting rod to said rod screw; with, rolling bearing elements disposed between said wrist pin and said journal means so as to reduce friction and transpose inertia weights to said journal means and, a stem portion forming part of said connecting rod, said stem portion operatively linked at an upper end to said journal means, and connected at a lower end to a half bottom journal which has case means retaining rolling bearing means disposed between said half bottom journal and a rotatable crankshaft;

said rolling bearing means replacing at least part of the crankshaft means web weights and transposing at least part of the web weights to said lower end of said connecting rod;

said half bottom journal connected to a half bearing case, said half bottom journal and said half bearing case retaining said rolling bearing means around a crankpin portion of said crankshaft.

66. A piston apparatus comprising:

a cylindrical top piston including an upper surface, an axially extending boundary edge, and a lower surface having a threaded cylindrical extension;

a triangular-cylindrical roller-bearing lower piston, including a central hollow portion with a bore and with a periphery from which a plurality of bearing-bracket-forming holders extend each having a respective extreme end supporting at least one respective rolling cylindrical barrel bearing spaced from the respective extreme end so as to roll freely around its respective axis;

a rod screw connecting said pistons along a common axis, said rod screw having a threaded top end adapted to connect to said threaded cylindrical extension to form a first threaded joint; and, lateral bore means in said cylindrical extension and said top end of said rod screw, said lateral bore means adapted to align at assembly in order to receive a laterally inserted securing means which prevents disassembly of said rod screw and said top piston;

said rod screw having an externally threaded middle section;

said triangular-cylindrical roller-bearing having internal threads in a bore of said central hollow portion, said internal threads adapted to engage in assembly with said external threads on said rod screw middle section, said internal and external threads forming a second threaded joint rigidly connecting said rod screw and said triangular-cylindrical roller-bearing; and, lateral bore means at said second threaded joint, said lateral bore means adapted to align at assembly of said second threaded joint and to receive laterally inserted securing means which prevents disengagement of said rod screw and said central hollow portion.

67. A piston apparatus according to claim 66 and further comprising:

a threaded lower end on said rod screw, said threaded lower end adapted to connect said rod screw to a wrist pin.

68. A combustion engine comprising:

at least one cylinder;

a reciprocable piston assembly with a cylindrical top piston and a lower piston disposed in said at least one cylinder;

said cylindrical top piston including an upper surface, an axially extending boundary edge, and a lower surface having a threaded cylindrical extension;

said triangular-cylindrical roller-bearing including a central hollow portion with a bore and with a periphery from which a plurality of bearing-bracket-forming holders extend each having a respective extreme end supporting at least one respective rolling cylindrical barrel bearing spaced from the respective extreme end so as to contact a cylinder wall and so as to roll freely around its respective axis when said lower piston reciprocates;

a rod screw for connecting said top piston and said lower piston along a common axis so that they reciprocate together, said rod screw having a threaded top end adapted to connect to said threaded cylindrical extension to form a first threaded joint; and, lateral bore means in said cylindrical extension and said top end of said rod screw, said lateral bore means adapted to align at assembly in order to receive a laterally inserted securing means which prevents disassembly of said rod screw and said top piston;

said rod screw having an externally threaded middle section;

said triangular-cylindrical roller-bearing having internal threads in a bore of said central hollow portion, said internal threads adapted to engage in assembly with said external threads on said rod screw middle section, said internal and external threads forming a second threaded joint rigidly connecting said rod screw and said triangular-cylindrical roller-bearing; and, lateral bore means at said threaded joint, said lateral bore means adapted to align at assembly of said second threaded joint and to receive laterally inserted securing means which prevents disengagement of said rod screw and said central hollow portion; and, connecting rod means adapted to connect said rod screw and said reciprocable piston assembly to a rotatable crankshaft; wherein, said triangular-cylindrical roller-bearing with said rolling cylindrical barrel bearing embodies transposed inertia weights which increase the torque and work output of the combustion engine.

69. A combustion engine according to claim 68 and further comprising:

an inner liner and an outer liner in said at least one cylinder.

70. A combustion engine according to claim 69 in which:
said inner liner defines said cylinder wall, and
said outer liner surrounds said inner liner.

71. A combustion engine according to claim 70 in which:
said inner liner is made from hard alloy metal so as to extend the operational life of said at least one cylinder, and,
said outer liner is made from alloy metal having a low thermal conductivity so as to reduce heat loss through said cylinder wall.

72. A combustion engine according to claim 68 and further comprising:
a wrist pin operatively connected to said rod screw means,
said wrist pin being pivotably disposed in a pin bore formed in journal means adapted for operatively linking said connecting rod means and said rod screw.

73. A combustion engine according to claim 72 and further comprising:
a top journal portion integral with said connecting rod means, said top journal portion forming said journal means; and,
two hollow cylinders spaced apart along a mutual axis and equally separated with respect to a center of a stem of said connecting rod means, said hollow cylinders forming two top journals of said top journal portion of said connecting rod means, said top journals receiving said pivotably disposed wrist pin; and,
bearing means for reducing friction between said wrist pin and said top journals.

74. A combustion engine according to claim 73 in which:
said bearing means includes rolling bearing elements disposed between said journals and said wrist pin,
said rolling bearing elements having multiple functions, including transposing inertia weights to said top journal portion of said connecting rod means.

75. A combustion engine according to claim 74 in which:
wrist-pin-washer means adapted to hold said rolling bearing elements in said top journals and retain said wrist pin in said pin bore.

76. A combustion engine according to claim 73 and further comprising:
a stem portion forming part of said connecting rod means, said stem portion connected at an upper end to said top journal portion and connected at a lower end to a half bottom journal;
said hald bottom journal having case means retaining rolling bearing means disposed between said half bottom journal and said rotatable crankshaft,
said rolling bearing means replacing at least part of the crankshaft mass web weights and transposing at least part of the web weights to said lower end of said connecting rod means.

77. A combustion engine according to claim 76 and further comprising:
half bearing case means connected to said half bottom journal in order to retain said rolling bearing means.

78. A piston apparatus comprising:
a plurality of pistons;
a rod screw for connecting said pistons along a common axis; and,
at least one of said pistons being a triangular-piston-bearing including a central hollow portion with a periphery from which a plurality of holders extend to form a bearing bracket;
each said holder having a respective extreme end supporting at least one ring of integral construction;
said triangular-piston-bearing having internal thread means in a bore of said central hollow portion, said internal thread means adapted to engage in assembly with external thread means on said rod screw, said internal and external thread means forming a first threaded joint connecting said rod screw means and said triangular-piston-bearing.

79. A piston apparatus according to claim 78 in which:
said plurality of pistons includes a cylindrical top piston, and a lower piston, said lower piston being a triangular-piston-bearing.

80. A piston apparatus according to claim 79 in which:
said cylindrical top piston includes an upper surface, an axially extending boundary edge, and a lower surface having means for connecting to a top end of said rod screw in a second threaded joint.

81. A piston apparatus according to claim 80 in which:
said top end of said rod screw has threads, and,
said lower surface connecting means is a threaded cylindrical extension adapted for assembly with said threaded top end of said rod screw.

82. A piston apparatus according to claim 81 and further comprising:
lateral bore means in said cylindrical extension and said top end of said rod screw means,
said lateral bore means adapted to align at assembly and to receive laterally inserted securing means which prevents disassembly of said rod screw and said top piston.

83. A piston apparatus according to claim 81 in which:
said first threaded joint is located at a middle thread of said rod screw.

84. A piston apparatus according to claim 83 and further comprising:
a threaded lower end of said rod screw,
said threaded lower end adapted to connect said rod screw to a wrist pin.

85. A piston apparatus according to claim 79 and further comprising:
lateral bore means at said first threaded joint, said lateral bore means adapted to align at assembly of said first threaded joint and to receive laterally inserted securing means which prevents disengagement of said rod screw and said central hollow portion.

86. A combustion engine comprising:
at least one cylinder;
a reciprocable piston assembly disposed in said at least one cylinder, said piston assembly comprising a plurality of pistons with at least a top piston and a lower piston;
a rod screw for connecting said top piston and said lower piston along a common axis so that they receiprocate together; and, connecting rod means adapted to connect said rod screw and said reciprocable piston assembly to a rotatable crankshaft; wherein, at least one of said pistons is a triangular-piston-bearing including a central hollow portion with a periphery from which a plurality of holders extend to form a bearing bracket;

each said holder having a respective extreme end supporting at least one ring of integral construction in contact with a wall of said at least one cylinder;

said triangular-piston-bearing having internal thread means in a bore of said central hollow portion, said internal thread means adapted to engage in assembly with external thread means on said rod screw, said internal and external thread means forming a first threaded joint connecting said rod screw means and said triangular-piston-bearing; wherein, said triangular-piston-bearing with said at least one ring embodies transposed inertia weights which increase the torque and work output of the combustion engine.

87. A combustion engine according to claim 86 and further comprising:

an innner liner and an outer liner in said at least one cylinder.

88. A combustion engine according to claim 87 in which:

said inner liner defines said cylinder wall, and, said outer liner surrounds said inncer liner.

89. A combustion engine according to claim 88 in which:

said inner liner is made from hard alloy metal so as to extend the operational life of said at least one cylinder, and, said outer liner is made from alloy metal having a low thermal conductivity so as to reduce heat loss through said cylinder wall.

90. A combustion engine according to claim 86 and further comprising:

a wrist pin operatively connected to said screw means, said wrist pin being pivotably disposed in a pin bore formed in journal means adapted for operatively linking said connecting rod means and said rod screw.

91. A combustion engine according to claim 90 and further comprising:

a top journal portion integral with said connecting rod means, said top journal portion forming said journal means; and, two hollow cylinders spaced apart along a mutual axis and equally separated with respect to a center of a stem of said connecting rod means, said hollow cylinders forming two top journals of said top journal portion of said connecting rod means, said top journals receiving said pivotably disposed wrist pin; and, bearing means for reducing friction between said wrist pin and said top journals.

92. A combustion engine according to claim 91 in which:

said bearing means includes rolling bearing elements disposed between said journals and said wrist pin, said rolling bearing elements having multiple functions, including transposing inertia weights to said top journal portion of said connecting rod means.

93. A combustion engine according to claim 92 and further comprising:

wrist-pin-washer means adapted to hold said rolling bearing elements in said top journals and retain said wrist pin in said pin bore.

94. A combustion engine according to claim 91 and further comprising:

a stem portion forming part of said connecting rod means, said stem portion connected at an upper end to said top journal portion and connected at a lower end to a half bottom journal;

said half bottom journal having case means retaining rolling bearing means disposed between said half bottom journal and said rotatable crankshaft, said rolling bearing means replacing at least part of the crankshaft mass web weights and transposing at least part of the web weights to said lower end of said connecting rod means.

95. A combustion engine according to claim 94 and further comprising:

half bearing case means connected to said half bottom journal in order to retain said rolling bearing means.

* * * * *